United States Patent [19]

Houghton

[11] Patent Number: 4,859,025
[45] Date of Patent: Aug. 22, 1989

[54] OPTICAL FIBRE CABLE

[75] Inventor: Ian Houghton, Newport, England

[73] Assignee: STC PLC, London, England

[21] Appl. No.: 267,643

[22] Filed: Nov. 3, 1988

Related U.S. Application Data

[63] Continuation of Ser. No. 906,301, Sep. 11, 1986, abandoned.

[30] Foreign Application Priority Data

Sep. 14, 1985 [GB] United Kingdom ................ 8522796
May 8, 1986 [GB] United Kingdom ................ 8611177

[51] Int. Cl.⁴ .............................................. G02B 6/44
[52] U.S. Cl. .................................................. 350/96.23
[58] Field of Search ...................................... 350/96.23

[56] References Cited

U.S. PATENT DOCUMENTS

| | | | |
|---|---|---|---|
| 4,110,001 | 8/1978 | Olszewski et al. | 350/96.23 |
| 4,354,732 | 10/1982 | Arnaud et al. | 350/96.23 |
| 4,416,508 | 11/1983 | Dey et al. | 350/96.23 |
| 4,491,387 | 1/1985 | Dey et al. | 350/96.23 |
| 4,647,151 | 3/1987 | Grogl et al. | 350/96.23 |
| 4,687,294 | 8/1987 | Angeles | 350/96.23 |

FOREIGN PATENT DOCUMENTS

| | | |
|---|---|---|
| 0020036 | 12/1980 | |
| 2082790 | 3/1982 | United Kingdom . |
| 2123164 | 1/1984 | United Kingdom . |
| 2141559 | 12/1984 | United Kingdom . |
| 0136887 | 4/1985 | United Kingdom . |
| 2156095 | 10/1985 | United Kingdom . |
| 2164471 | 3/1986 | United Kingdom . |

OTHER PUBLICATIONS

AEG-KABEL Technical Review Issue 1/84 E "Non-Metallic Long Span Aerial Cable with Optical Fibres".
International Wire and Cable Symposium Proceedings 1982, pp. 390 to 395.

Primary Examiner—William L. Sikes
Assistant Examiner—Robert E. Wise
Attorney, Agent, or Firm—Lee & Smith

[57] ABSTRACT

An aerial optical fiber cable comprises a glass-fibre-reinforced plastics core member (1) having a slot (2) with a zero lay angle accommodating loose-tubed optical fibres (3, 3A) and sheathed with a longitudinal tape (13) bound with a binder (915) and over-sheathed with a plastics extrusion (14). The cable is self-supporting and completely non-metallic and is suitable for telecommunications and data transmission services alongside overhead power transmission systems. An alternative embodiment (FIG. 2) is not self-supporting but is similar in design and adapted for support from a support wire, and another embodiment has a rectangular slot housing one or more ribbon elements. The cable is simple and cheap to make.

16 Claims, 4 Drawing Sheets

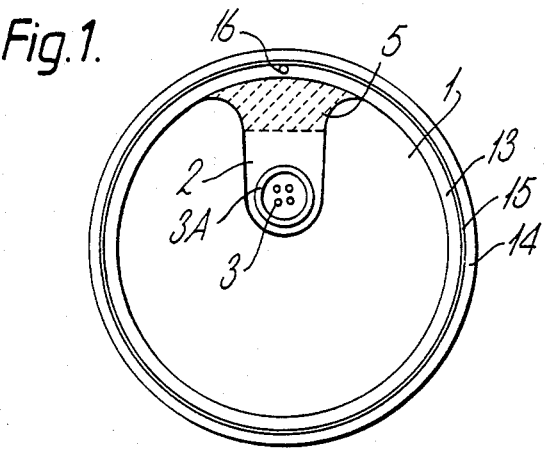
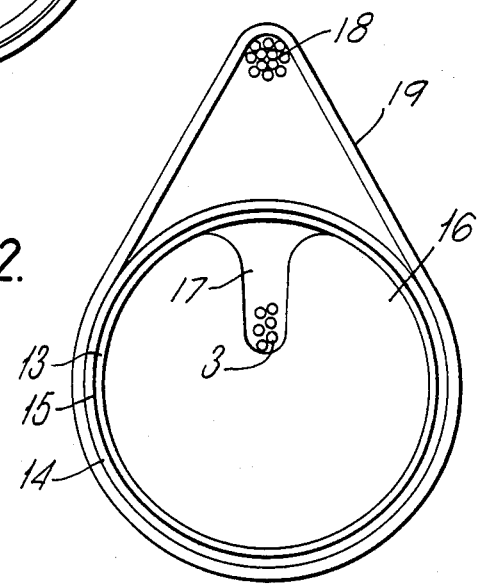
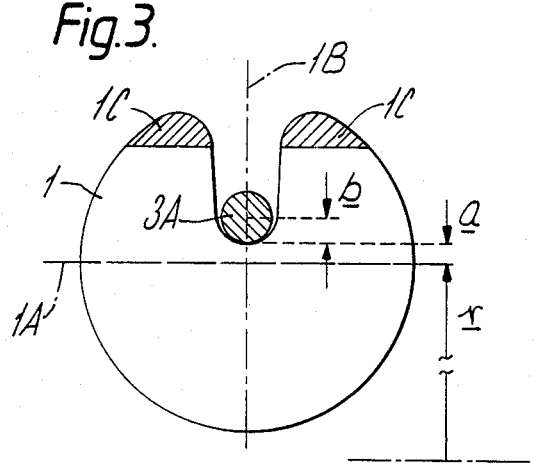

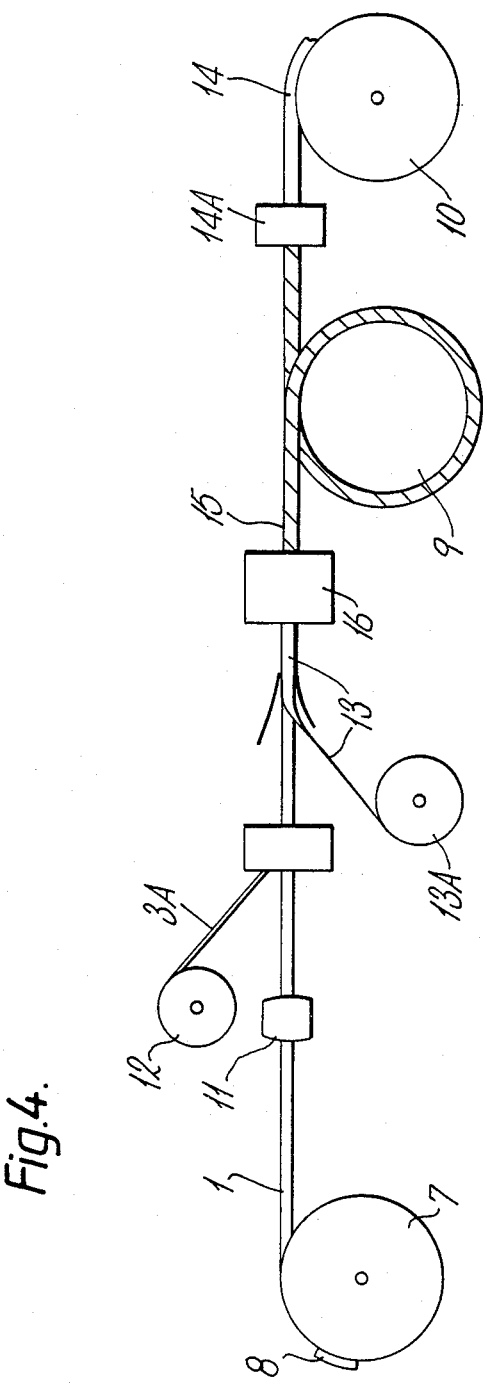

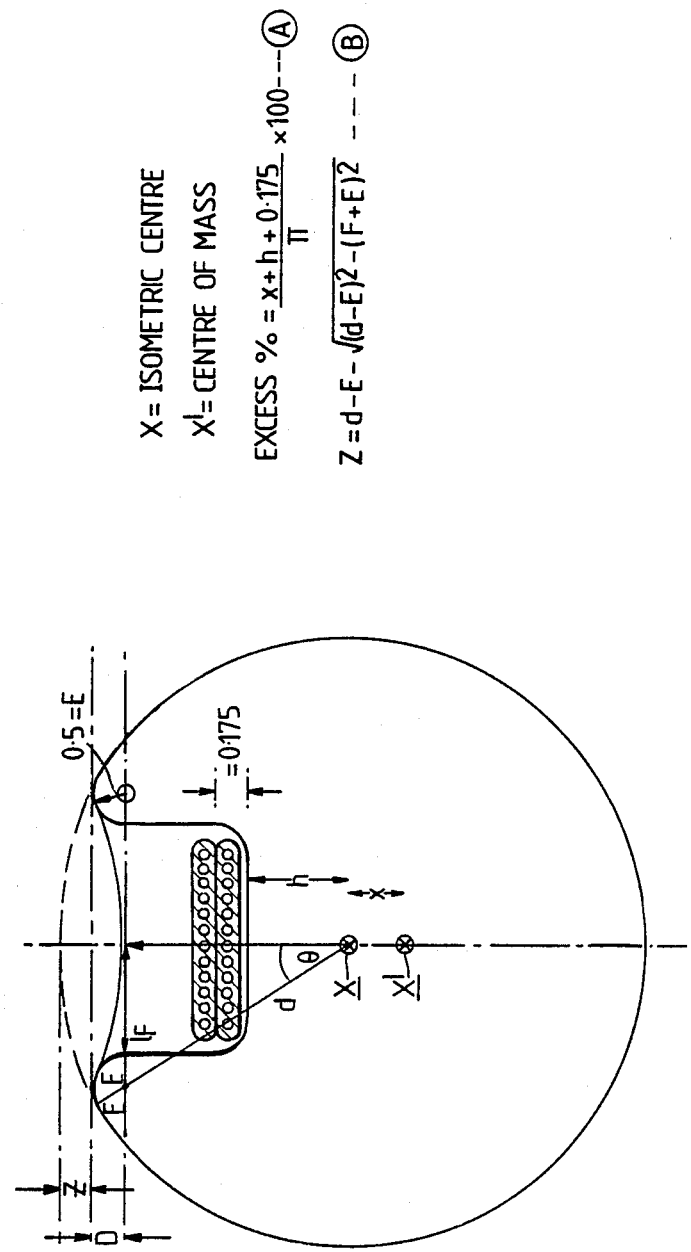

1

OPTICAL FIBRE CABLE

This application is a continuation of application Ser. No. 906,301, filed Sept. 11, 1986, now abandoned.

BACKGROUND OF THE INVENTION

This invention relates to optical fibre cables, particularly long span aerial cables incorporating optical fibres.

Various cable designs have been proposed for use as aerial cables incorporating optical fibres, for example as earth wires in an overhead power transmission system. When an overhead power transmission system is installed, it is convenient to use the same route for purely telecommunications purposes and it has already been proposed to provide a communication system via an earth wire of the power transmission system. British Patent No. 2029043 B is an example of an overhead earth wire cable for a power transmission system incorporating an optical fibre for telecommunication purposes.

On existing power transmission routes which have not had an optical fibre cable installed in the earth wire, then three alternatives exists in order to install a fibre optic cable in an existing route. The first alternative is to replace the existing standard earth conductor wire with a fibre optic earth wire as mentioned above in British Patent No. 2029043 B; another alternative would be to wrap a fibre optic cable around a power conductor of the system; and a third alternative would be to install a self-supporting optical fibre aerial cable by suspending it from the pylons which support the existing system.

The first two options above are expensive and inconvenient, requiring as they do the complete shutdown of the power transmission system while the modifications are effected.

The third alternative offers the more satisfactory solution. However it is undesirable to install a cable which contains metallic elements because the presence of an additional electrically conductive cable in the vicinity of the power conductors of a power transmission system adversely affects certain aspects of the existing system operation. it is therefore necessary to provide a non-metallic fibre optic cable and such a cable has already been proposed. This known aerial fibre-optic cable is made by Standard Electric Lorenz in Germany and comprises a helically-laid-up fibre optic package surrounded by a glass-fibre reinforced tube acting as the strength member and formed into position around the fibre optic bundle during manufacture of the glass fibre reinforced strength member.

Although such a cable is effective in providing a self-supporting telecommunications link in an existing power transmission system, it nevertheless has certain disadvantages, not least being the cost of the cable and the limited amount of excess fibre which can be achieved in order to minimise damage to the fibre under conditions of use.

It is an object of the present invention to provide a metal-free aerial optical fibre cable which is cheap to produce and effective in its application.

SUMMARY OF THE INVENTION

According to one aspect of the present invention there is provided an optical fibre cable comprising an elongate core member defining a surfacial longitudinally-extending slot and forming the main tensile strength member of the cable, one or more optical fibres located in said slot, and means closing the slot, said core member also forming the main crush-resistant armouring around the optical fibres, there being an excess length of fibres in the slot.

According to another aspect of the present invention there is provided a method of making a fibre optic cable comprising providing an elongate core member defining at least one longitudinally-extending slot, feeding at least one optical fibre into the slot, and applying means to close the slot, wherein the core member is made of a non-metallic material having a high elastic modulus.

According to yet another aspect of the present invention there is provided a method of making an optical fibre cable comprising providing a strength member core having a longitudinal slot in its surface, providing a ribbon-like element containing a plurality of optical fibres held in side-by-side relationship in the ribbon element, feeding the ribbon element into the slot in the core such that there is an excess length of element in the finished cable, and encasing the core in a sheath to retain the element within the slot.

Preferably the slot has a flat bottom and the ribbon optical fibre element lies on the flat bottom and has a width similar to the width of said bottom.

Preferably also there are two such optical fibre ribbon elements lying flat one on top of the other.

Preferably the core member is made of glass reinforced plastics rod and in one example the diameter of the rod is about 10 mm. The glass reinforced plastics may use E, S, R or T glass with polyester, vinyl ester or epoxy based resins.

Very perferably the core member is made by a pultrusion technique.

BRIEF DESCRIPTION OF THE DRAWINGS

In order that the invention can be clearly understood reference will now be made to the accompanying drawings, wherein:

FIG. 1 shows in cross-section a self-supporting optical fibre cable according to an embodiment of the present invention;

FIG. 2 shows a second embodiment of a non-self-supporting optical fibre cable according to the present invention;

FIG. 3 is a schematic drawing of a core part of the cable of FIG. 1 and is used to explain the design of the cable;

FIG. 4 shows schematically part of the manufacturing apparatus for manufacturing the cable shown in FIG. 1;

FIG. 7 is a diagram explaining some calculations on the dimensions of the core member.

DESCRIPTION OF THE PREFERRED EMBODIMENTS

Figure 5:
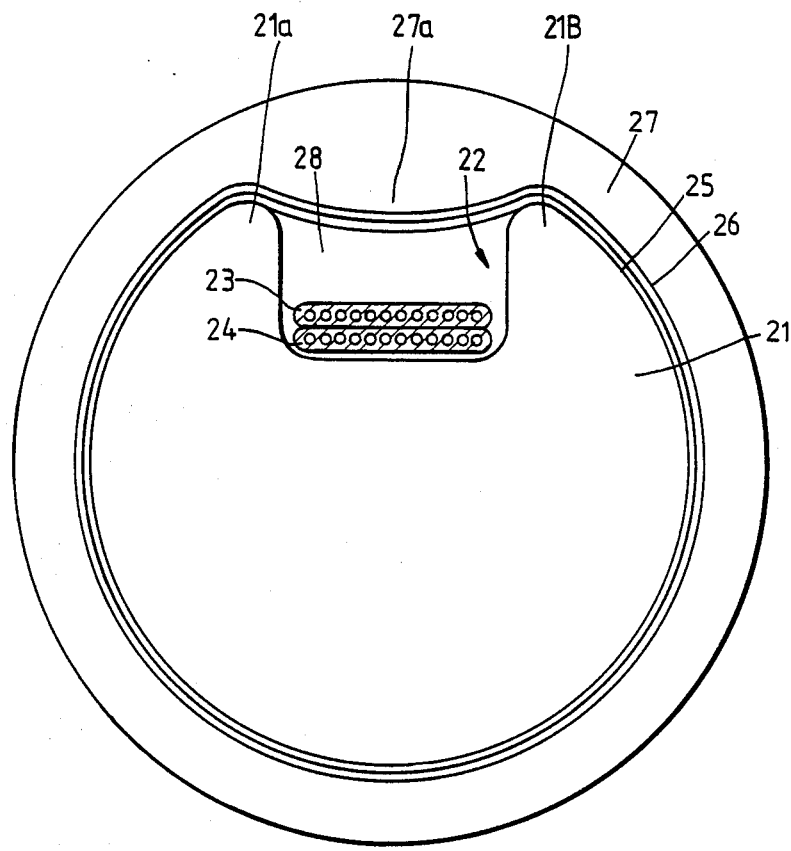
FIG. 5 shows in cross-section an aerial optical fibre cable according to third embodiment of the present invention.

Referring to FIG. 1 a non-electrically-conductive slotted core of homogeneous material in the form of a C-section profile 1 is made from glass-fibre reinforced plastics by a Pultrusion or similar process; it could be made from some other fibre-reinforced composite which is non-metallic and which acts as a cable strength member and armour and is resilient with a modulus of at least 40,000 N/mm$^2$. For example the fibres could be an aramid fibre (such as Kevlar-RTM) or carbon fibres. The resin is a polyester-based material. A modulus for the glass-fibre-reinforced material would be at least 40,000 N/mm$^2$ and of the order of 45,000 N/mm$^2$ and this can be achieved using E-grade glass. However the higher the modulus, the better, and moduli of 70,000 are attainable using T-grade glass (Japan).

A slot 2 runs straight along the profile 1 and is arranged to be on the outside of the profile as it is bent around a capstan 9 to obtain excess fibre, explained in more detail in FIG. 4. The slot 2 accepts optical fibres 3, housed in a loose tube 3A. Around the outside of the C-section profile is a composite plastics sheath comprising a longitudinal tape 13, a woven yarn wrapping 15 and a extruded outer sheath 14. This maintains the optical fibres 3 within the slot 2. There may, optionally, be a filler member 5 (shown in broken line) which closes the slot and prevents the optical fibres 3 from slopping around inside the slot 2, and in that variation, it would not be necessary to have the tape 13.

In manufacturing the cable it is important that the finished cable has an excess length of fibre in the slot 2. Referring to FIGS. 3 and 4 this is achieved, in the preferred embodiment of the method, by running the profile 1 from a storage reel 7 which has a brake 8 which can be applied to brake rotation of the reel 7, over a capstan 9 and on to a storage drum 10. An orientation die 11 projects in to the slot 2 to ensure that the slot is maintained directed radially outwardly with respect to the capstan 9, although it is found that the profile has a natural tendency to offer this slot outwardly when bent. The diameter of the capstan 9 is close to or equal to the designed minimum bend diameter of the cable. As the profile proceeds towards the capstan 9, tubed optical fibres 3, 3A are fed in from a storage reel 12 and the composite sheath is formed by applying a longitudinal polyethelyne tape such as 13 from a reel 13A, with overlapping edges. Over the longitudinal tape 13 is applied a helically-wound binder 15 of polyester material, at station 16. The partially-sheathed profile 1 is then passed around the capstan 9 whose diameter is close to the minimum designed bending diameter of the cable, and would lie in the range 0.6 m for an 8 mm diameter profile core to 1.5 m for a 12 mmm core. The profile would have up to four turns around the capstan and the purpose of the capstan is to induce an excess length of fibre in the cable. Then a low density polyethelyne sheath 14 which is UV stable is extruded over the helically wound binder at station 14A and amalgamates with the longitudinal tape 13 to prevent slippage of the composite sheath relative to the profile 1 for example when it is clamped.

The distance between tubed fibre payoff 12 and capstan 9 is kept short e.g. 1 to 2 meters, although it could be longer provided the excess fibre can be "drawn" by the capstan without feedback around the capstan occurring.

The excess length of tubed optical fibre within the constructed cable is achieved due to the circumferential differences of the optical fibres 3A in the slot 2 of the profile 1. Excess fibre is additionally achieved by shrinking the tube 3A around the optical fibres 3 when the fibres 3 are laid up in the tube 3A in an earlier process, by careful cooling and drying of the tube 3A after extrusion around the fibres 3. Thus as shown in FIG. 3, provided the neutral axis 1A of the profile 1 is beneath the bottom of the slot 2 then an excess of tubed optical fibres 3A will be achieved and become effective when the cable is straightened out in use.

The profile when it straightens out after leaving the capstan 9 shortens at the upper slot side and lengthens on its lower side remote from the slot. It will, in effect, probably rotate or bend about its centre of mass and the element that has been placed in the slot will therefor become slack having acquired excess length over the slot. This will occur provided the "excess" cannot work backwards along the capstan. This requires a reasonably high degree of friction, or a large contact area. This may be able to be provided by a 360° turn around the capstan 9, i.e. 1 turn, but 2, 3 or even 4 turns may be found necessary to prevent feedback from the straight portion between capstan 9 and take-up drum 10 effectively reducing the excess fibre. The take-up drum 10 will be larger than the capstan and similar in size to the reel 7, e.g. 1.2 m to 1.7 m diameter. The degree of excess element in the slot will be determined by the distance of the bottom of the slot from the neutral axis of the profile. The larger this distance then the larger the proportional excess of element which is achieved.

If the profile bends around a radius r (FIG. 3) and the element around a radius r+a+b, where a is the distance of the base of the slot from the neutral axis of the profile, and b is the distance of the axis of rotation of the element from the base of the slot, then the path length difference is $$\frac{2\pi(r + a + b) \pi 2r}{2\pi r}$$
$$= \frac{a + b}{r}$$

If r is the minimum bend radius of the profile e.g. 300 mm and a+b is 1 mm, then the excess slack $$= 1/300 = 0.0033$$
$$= 0.33\%$$

This would more than double the maximum tension the cable could endure.

The excess optical fibre is held in by the binding and tape indicated by reference numerals 13, 15 and 14.

There are two suitable sizes for the core 1:8 mm diameter for the profile member, suitable for pylon spans of 1100 to 1400 feet in regions where there is no possibility of ice, e.g. Sudan or India; and 12 mm for countries where ice has to be taken into account, e.g. UK. The maximum diameter envisaged is 14 mm. For the 8 mm size the slot will be 4 mm deep and 3 mm wide, but would optimally be 2.5 mm wide. For the 12 mm profile, the slot depth will be between 4 and 6 mm and the width between 2.5 mm and 3.2 mm.

There will be four or six fibres 3 (although there could be as many as ten) and these are pre-housed in the plastics tube 3A. This has been found to produce a reliable excess of fibre when installed in the slot in the profile. An excess of about 0.2 to 0.25% can be achieved in the tubed fibre by controlled shrinkage of the tube during extrusion and cooling of the tube around the fibres. However this in itself is unlikely to be sufficient and further excess is achieved by the cabling technique already described which provides an additional excess of about 0.5%, making a total of 0.7-0.75%. A better excess may be achievable, allowing 1.00% strain on the finished cable without straining the fibres beyond 0.25%, which is a universally adopted standard.

Thus the excess length of tube compared to cable is greater than the excess length of fibre compared to tube when the cable is straight and untensioned.

The profile has a preferred plane of bend 1B (FIG. 3) which coincides with the central longitudinal plane of symmetry of the slot 2. It may be preferable to modify the tips 1C of the profile, which undergo the greatest strain around the capstan 9, by incorporating fibres having greater ultimate strain at those extremities than for the remainder of the profile. This is possible using the Pultrusion process and ensures that failure of the tip fibres does not occur around the capstan 9.

Referring to FIG. 2, there is shown an alternative design intended to be supported from a support wire. Here a C-section profile 16 of less than 8 mm and about 3 or 4 mm diameter is made of the same material as profile 1 of FIG. 1, and has a narrow slot 17 containing several loose acrylate-coated fibres 3. A composite sheath is applied in the same way as in FIG. 1 and like reference numerals represent like parts. The cable is slung from a support member 18 by a sling 19. Since the cable will suffer less stress than the embodiment of FIG. 1, a large excess of fibre is not required and the fibres 3 can be fed into the slot 17 under no tension while the member 16 is under some tension, to thus provide a slight excess length of fibre in the finished cable. Hence the bottom of the slot 17 will lie at or below the neutral axis of member 16.

The slot 17 is very narrow, much narrower than in FIG. 1.

In both the embodiments of FIGS. 1 and 2 the pultruded profile 1 or 16 provides the sole longitudinal strength member of the cable per se and the solid armour and crush-resistant member of the cable, in a single integrally-formed element. This provides significant economy of production and high speed production. Another advantage of this design of cable is the ease with which the fibres can be accessed by simply cutting through the composite sheath above the slot, and withdrawing the fibres through the side of the slot. Thus there is provided a "weak" line for gaining access to the fibres and it is proposed to incorporate a rip cord (16 in FIG. 1) either in the slot or between the binding 15 and the longitudinal tape 13 to enable access to the fibres by pulling the rip cord. Such a rip cord could be similarly applied to FIG. 2.

Yet another advantage is that glass reinforced plastics does not "creep" in tension, unlike steel and other materials.

The embodiments of FIG. 1 would have a permissible tensile load of 36 kN (12 mm dia. version) and 20 kN (8 mm dia. version). The thermal expansion coefficient of glass reinforced plastics would match very closely that for the optical fibres and would be about $0.7 \times 10^{-6}$ per °C. The permissible span allowing a 12 mm ice radial and a 55 mph wind would be 1100 to 1400 ft at $-5.6°$ C., with an optical safety factor of 1.3 and a mechanical safety factor of 2. At 0° C. the maximum sag with the same ice radial would be about 33 ft.

Referring now to FIG. 5 of the drawings the cable comprises a pultruded core 21 made of glass reinforced plastics using E glass and polyester or vinyl ester resin. In this particular embodiment the core has a diameter of approximately 10 mm and a slot 22 formed in the core during the pultrusion manufacturing process and parallel to the core axis. In this embodiment the slot width is 3.8 mm and the slot base thickness 6.8 mm. It is rectangular in cross-section and the corners have a radius of 0.5 mm.

As shown the slot contains two optical fibre ribbon elements 23 and 24 lying on the bottom of the slot. Each ribbon contains twelve single mode optical fibres and in this embodiment the ribbons are each 3.2 mm wide and 0.35 mm deep. Preferably these optical fibre ribbon elements are made according to the process described in our co-pending British Patent Application No. 8524484 (J. R. Gannon 3-1-1).

This particular embodiment of cable has a maximum cable strain of 0.73% and a maximum allowable tension of 23,700 N, which gives a span capability of up to 540 meters, based on current ESI pylons with typical sags and UK loadings and safety factors.

Around the slotted core 21 is a binder 25 and over the binder 25 is a tape 26.

Over the tape 26 is extruded a plastics sheath 27.

The slot 22 is filled with a viscous filling compound 28 such as one sold under the trade name SYNTEC particularly a soft one such a type FCC210F. This material is a dielectric compound that prevents moisture collection but allows the ribbon cable elements to move up and down in the slot.

Figure 6:
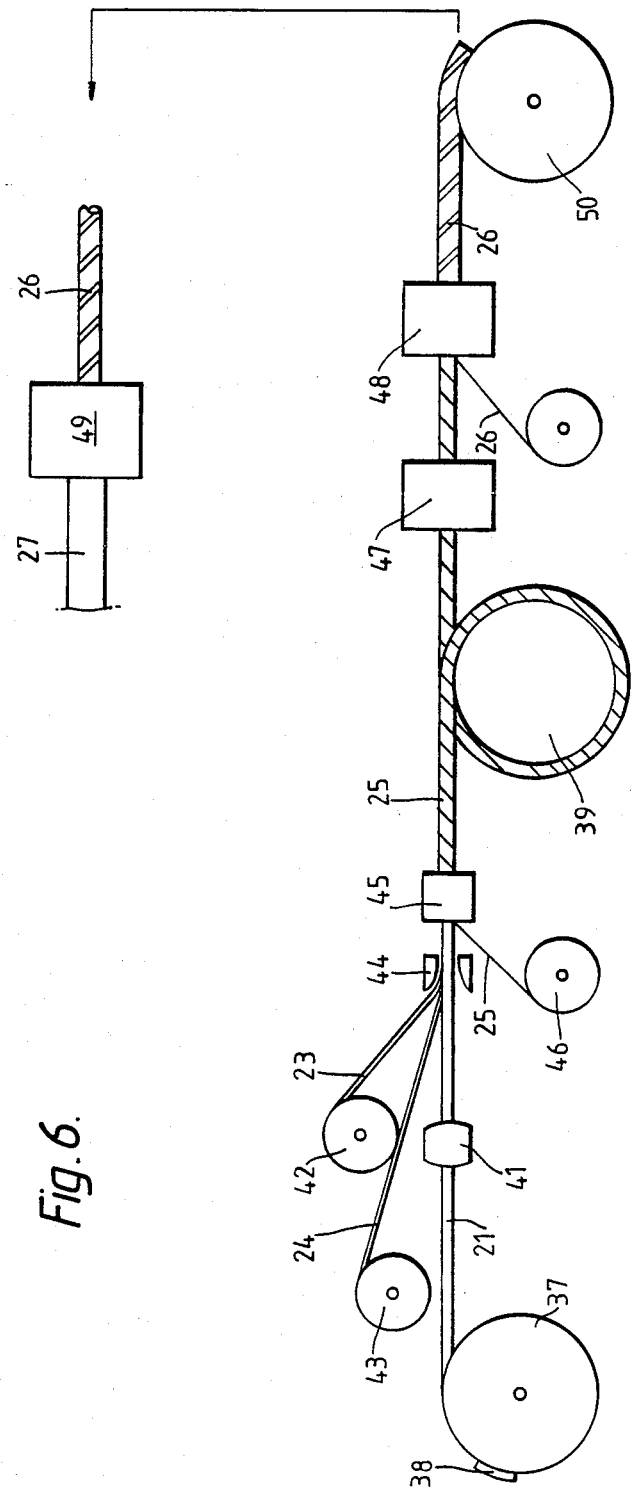
FIG. 6 shows schematically a manufacturing process for making the cable of FIG. 5.

Reference will now be made to FIG. 6 of the drawings which shows schematically a manufacturing process for the cable of FIG. 5.

Referring to FIG. 6 it is important in manufacturing the cable that the finished cable has an excess length of fibre in the slot 22. This is achieved, in the preferred embodiment of the method, by running the profile 21 from a storage reel 37, which has a brake 38 which can be applied to brake rotation of the reel 37, over a capastan 39 and on to a storage drum 40. An orientation die 41 projects in the slot 22 to ensure the slot is maintained directed radially outwardly with respect to the capstan 39, although it is found that the profile of the core 21 has a natural tendency to offer this slot outwardly when bent around the capstan. The diameter of the capstan 39 is close to or equal to the designed minimum bend diameter of the cable. As the profile proceeds towards the capstan 39, the ribbon optical fibre cable elements 23 and 24 are fed from storage reels 42 and 43 respectively via a guide member 44 which guides the ribbon elements 23 and 24 one on top of the other in to the slot so that they lie flat on the bottom of the slot 22.

Immediately following the guide member 44 is a binder application stage 45 at which the binder 25 supplied from a reel 46 is wound around the core 21 in order to maintain the ribbon cable elements in the slot 22.

The bound core 21 with the ribbon elements inside is then drawn around a capstan 39 which, in this embodiment has a diameter of approximately 1 meter. The capstan provides an excess length of ribbon elements within the slot when the core leaves the capstan and enters the water blocking filling station 47. Here water blocking viscous material is pumped in to the slot and fills the slot, entering it via the interstices of the binder 25.

The filled cable core then enters a taping station 48 at which the tape 26 is applied to the cable core. The tape is helically wound and closes off the slot. The tape 26 could be made of Kevlar (RTM) to give added protection against physical damage.

The taped core is wound on to a take-up drum 50.

From the take-up drum the taped core is fed through an extruder 49 which extrudes the sheath 27 over the taped core.

The process described above could be modified. For example the process could be divided into two separate processes, the first including the binder 25, capstan 39 and then direct onto the take-up drum 50 for storage. From there the bound cable core would be fed to the filling station 47 and then to the taping station 48.

Thus the bound core with the excess of fibre could be stored and subsequently have the filling material and the tape applied.

The capstan diameter is as stated above 1 meter which is appropriate for a 10 mm core. The centre of bend of the ribbons is (0.25+0.1)/2=0.175 mm above the base of the slot. The centre of bend of the core is measured either by calculating the centre of mass, or modelling the centre of mass. We have found that measurement is not possible before the core section has been made, and calculations or modelling are subject to the approximation that the tensile modulus is similar to the compressive modulus. If this is valid, then modelling the centre of mass is a reasonable approximation and from these calculations a 0.5–0.6 mm shift for a 10 mm core is obtained. One very simple way is to cut a card or disc cross-section of the core profile on a larger scale, and spin the cross-sectional disc about various approximate centre points to eventually find the balance point i.e. the centre of mass. We have discovered that for a core of approximately 10 mm in diameter the shift amounts to 0.55 mm. This of course is an approximation because it depends on the shape and size of the slot in the core. But it is we believe an allowable approximation since the shape and size of the slot is known within reasonable practical limits. The slot width is normally going to have more effect on the centre of mass than the slot depth.

Therefore the excess length of ribbon fibre element over the length of the core can be calculated thus:

% Excess=(x+h+0.175)·(100/500)

where x=the distance between the centre of the core circle and the centre of mass, h=the distance between the centre of the circle and the bottom of the slot and 0.175=half thickness of the or each optical fibre ribbon element, and that figure for the excess is the excess per meter length of the cable assuming that the diameter of the capstan 39 is exactly 1 meter.

The percentage excess incorporated in the cable depends clearly upon the value of h and also the slot space avaialable. Clearly as h is increased in order to increase the excess, so the slot space decreases. If the slot space is too small for a particular predetermined excess of optical fibre ribbon element, then the optical fibres within the ribbon element will be bent beyond their minimum allowable bending radius. For example this could be about 75 mm and this figure is assumed in the calculations which follow. However it may be possible to achieve a smaler minimum bend radius e.g. 50 mm corresponding to the minimum bend radius of the fibre outside the ribbon containment i.e. bare fibre. As shown in FIG. 7 of the drawings the slot depth is also restricted to some extent by the "dip-in" caused by the oversheathing of the core. Although this is obviously dependent upon the sheath technique used, we have found that for a slot width of 3.2 mm a "dip-in" of approximately 0.28 mm ocurred. The "dip-in" can be regarded as proportional to the slot width so that a 3.8 mm slot will have a "dip-in" of 0.332 mm.

Further space is lost by the fact that the upper tips of the profile shown in FIG. 7 are rounded off so that the tips do not lie on the outside diameter of the profile. If we assume that the slot width is fixed at 3.8 mm plus or minus 0.1 mm, and the rib radius at a nominal value of 0.5 mm, an expression can be derived for space lost versus the core diameter. Space lost is defined as z as shown in formula B in FIG. 7. In the formula E is the radius of curvature of the tips, and F is half the width of the slot 2.

It is therefore possible to tabulate for a variety of tip radii ranging from 0.4 mm to 0.6 mm, a slot width ranging from 3.7 mm to 3.9 mm, a core diameter ranging from 9.8 mm to 10.4 mm, and for each value of tip radius a value for space lost Z can be calculated. This ranges from 0.56 for a tip radius 0.4, a slot width of 3.7 and core diameter of 10.4 to 0.84 for a tip radius of 0.6, a slot width of 3.9 and a core diameter of 9.8.

Another parameter that has to be determined is the load that the cable has to bear. This is determined by the sag, and the span (which are fixed by the National Electricity Distribution Authority) and the cable weight, wind loading and ice loading (which vary with the cable diameter). In the particular application envisaged the span can vary from 330 meters to 500 meters and the sag with a 12.5 mm ice load at 0° C. ranges from 9.58 meters to 21.45 meters. Even 1500 meter span with a large sag is possible to span e.g. a lake or wide river.

The cable weight will depend on the components which are glass reinforced plastics, optical fibres, filling compounds such as SYNTEC, the binder yarn, the tube 16 which in this embodiment is paper, and the sheath compound which in this embodiment is high density polyethelene or cross-linked polyethelene but it could with advantages be made of a material more abrasion-resistant than polyethelene. The cable weight is found not to be a major factor, and the slot is a minor part of the cable weight. It is therefore reasonable to assume that the slot area A equal 3.8×h. In a 10 mm core, a 0.5% excess needs 5−1.9−0.7=2.4 mm for h. This also corresponds to a 75 mm minimum fibre bend radius at 0.54% excess. For a slot area A=3.8×2.4=9.12 mm² and if the mean slot density is 1, then the weight will be 0.089 N per metre for the slot.

The core area equal $\pi r^2$−9.12−0.7×1.9 and if the GRP density is 2.07, and the paper which will be partly soaked with filling compound will have its density increased to approximately 0.95 so that the sheath plus the paper/binder with a diameter increment of 2.5 mm from the sheathing gives an overall weight of 0.412 N per meter.

Therefore the weight for the cable can be calculated for a variety of diameters of the core member from 9.8 to 10.4 giving a weight ranging from 177 kilograms per kilometer to 196 kilograms per kilometer.

The table below shows the parameters which apply to a core diameter varying from 9.0 to 10.4 from which it can be seen only a core diameter of 9.7 mm upwards provides a core which can accommodate two optical fibre ribbon elements with the satisfactory amount of excess.

| GRP Diam (mm) | Space Loss (mm) | Min h | Min Space Needed | Max h | Mean h | Tolerance h | Comment. |
|---|---|---|---|---|---|---|---|
| 9.0 | 1.13 | | | | | | |
| 9.1 | 1.12 | | | | | | |
| 9.2 | 1.11 | | | | | | |
| 9.3 | 1.10 | | | | | | |
| 9.4 | 1.09 | 1.7 | 2.1 | 1.51 | — | — | Out of Space |
| 9.5 | 1.08 | 1.65 | 2.05 | 1.62 | — | — | " |
| 9.6 | 1.07 | 1.6 | 2.0 | 1.73 | 1.67 | ±0.07 | OK, tolerance too fine |
| 9.7 | 1.06 | 1.55 | 1.95 | 1.84 | 1.7 | ±0.15 | OK |
| 9.8 | 1.045 | 1.5 | 1.9 | 1.95 | 1.73 | ±0.23 | OK |
| 9.9 | 1.04 | 1.45 | 1.85 | 2.06 | 1.76 | ±0.31 | OK |
| 10.0 | 1.03 | 1.4 | 1.8 | 2.17 | 1.79 | ±0.39 | OK |
| 10.1 | 1.02 | 1.35 | 1.75 | 2.28 | 1.82 | ±0.47 | OK |
| 10.2 | 1.09 | 1.3 | 1.7 | 2.39 | 1.85 | ±0.55 | OK |
| 10.3 | 1.00 | 1.25 | 1.65 | 2.50 | 1.88 | ±0.63 | OK |
| 10.4 | 0.99 | 1.2 | 1.6 | 2.61 | 1.91 | ±0.71 | OK |

It is therefore convenient to choose a core diameter of approximately 10 mm. Below 9.7 mm the tolerance on the value of h becomes too critical for normal manufacturing processes.

The choice of slot height h can be anywhere between 1.4 mm and 2.2 mm from the theoretical analysis. As the slot gets smaller the excess fibre increases, but the space for excess decreases. Since too much excess is unlikely to be a problem, it is considered best to err on the high percentage excess side.

The following table illustrates the parameters, particularly the excess generated versus the excess which is allowed by the slot size.

| h | Eff. slot | XS gener'd | XS all'd | Diff. | Max strain | Max ten. | Max rated ten. | Marg. |
|---|---|---|---|---|---|---|---|---|
| 1.4 | 2.6 | 0.405 | 0.58 | | | | | |
| 1.5 | 2.5 | 0.425 | 0.56 | | | | | |
| 1.6 | 2.4 | 0.445 | 0.54 | | | | | |
| 1.7 | 2.3 | 0.465 | 0.515 | | | | | |
| 1.8 | 2.2 | 0.485 | 0.49 | Best Match | 0.735 | 23772 | 21096 | 2676 |
| 1.9 | 2.1 | 0.505 | 0.47 | | | | | |
| 2.0 | 2.0 | 0.525 | 0.45 | | | | | |
| 2.1 | 1.9 | 0.545 | 0.43 | | | | | |
| 2.2 | 1.8 | 0.565 | 0.404 | | | | | |

However it is to be understood that larger or smaller cables can be made and if the minimum bend radius could be reduced to say 50 mm then an excess as much as 0.8% could be achieved. It is also believe in some designs for very short spans, as little as 0.2% excess may be sufficient.

It can be seen that the best match occurs where h equals 1.8, slot depth equals 2.2 mm, excess generated equals 0.485 and the excess allowed equals 0.49. This gives a maximum strain of 0.735 a maximum tension (N) of 23,772 a maximum rated tension of 21,096, giving a margin of 2,676.

As a result of the calculations described above, the optimum size of core for the cable is as follows:

| Diameter (2d) | 10.0 mm + or − 0.15 |
|---|---|
| Slot Width (2F) | 3.8 mm + or − 0.1 mm |
| Tip Radius (E) | 0.5 mm + or − 0.1 |
| Slot Corner Radius | 0.5 mm + or − 0.1 |
| h | = 1.8 mm |
| h + d | = 6.8 mm + or − 0.1 mm |
| Optical Fibre Ribbon | |
| thickness | 0.175 mm |

A big advantage of the ribbon element in the single-slot core resides in the ability to scale down the whole cable size for e.g. shorter spans. For example a core diameter of just 5 mm is possible having a slot of 2 mm width, 2 mm depth, containing loosely a ribbon optical fibre element containing say four fibres. In particular this provides a much more flexible cable suitable for e.g. local area telegraph poles or along railway lines.

In a further modification it is proposed to use a tubing die in the extruder 49 and omit the taping operation 48 and put the extruder on-line in the position presently occupied by taping station 48. This enables a single-line production arrangement. What is more the "dip" 27a in FIG. 5 can be avoided by shaping the tubing die profile so that the dip 27a becomes a "flat" bridging directly across between the tips 21A and 21B of the slot walls. This provides more room for the excess fibre than in the embodiment described.

The cables described (apart from FIG. 2 embodiment) are intended to be strung from overhead pylons using conventional cable support clamps with reinforcing overlay and underlay rods and spiral vibration dampers.

I claim:

1. An aerial optical fiber cable suitable for long spans comprising an elongate core member having a central longitudinal axis and defining a surfacial slot extending parallel to said axis, said member being the main tensile strength member of the cable and wholly consisting of high tensile strength material, at least one optical fiber located in said slot, and means closing the slot, said core member also being the main crush-resistant armouring around the optical fiber, there being an excess length of fiber in the slot.

2. A cable as claimed in claim 1 wherein the core member is made of a pultruded glass-reinforced-plastics material.

3. A cable as claimed in claim 1, comprising a tubular member within said slot and containing the fibres, there being an excess length of the fibres within said tube and an excess length of tubular member within said cable.

4. A cable as claimed in claim 1, said slot containing loose optical fibres.

5. An optical fibre cable as claimed in claim 1 and having a ribbon element containing optical fibres side-by-side in said slot.

6. A cable as claimed in claim 1 wherein the excess length of element within the cable lies in the range 0.2 to 0.8%.

7. A cable as claimed in claim 1 wherein the diameter of the core member is approximately 10 mm.

8. A cable as claimed in claim 1, wherein the slot is of substantially rectangular shape.

9. An optical fibre cable as claimed in claim 1, wherein the core member is made wholly of a nonelectrically-conducting material.

10. A method of making an aerial fibre optic cable suitable for long spans comprising providing an elongate core member having a central longitudinal axis and defining at least one longitudinally-extending slot extending parallel to and located wholly to one side of sais axis, feeding at least one optical fibre into the slot, and applying a sheath around the core member, wherein the core member is made of a non-metallic material having a high elastic modulus of the order of 40,000 N/mm$^2$.

11. A method of making a cable as claimed in claim 10 wherein the core member is bent around a capstan to provide excess fibre in the cable when straightened.

12. A method as claimed in claim 10, wherein the fibres are housed in a tube and there is an excess length of fibres within the tube prior to introducing the tubed fibres into the slot.

13. A method of making an aerial optical fiber cable suitable for long spans comprising providing a strength member core consisting wholly of high tensile strength material and having a central longitudinal axis and a longitudinal slot in its surface extending parallel to said axis, providing a ribbon-like element containing a plurality of optical fibres held in side-by-side relationship in the ribbon element, feeding the ribbon element into the slot in the core such that there is an excess length of element in the finished cable, and encasing the core in a sheath to retain the element within the slot.

14. A method as claimed in claim 13, comprising after the element has been introduced into the slot in the core, applying a binder to the core to retain the element in the slot, and bending the core around the capstan such that over-feedin of the element in to the core is induced to produce said excess.

15. A method as claimed in claim 14 comprising encasing the bound core in a tape and encasing the taped core in an extruded plastics material.

16. A method as claimed in claim 13 comprising filling the slot with a viscous water blocking material at a position in which the cable core contains the excess length of element.

* * * * *